INVENTORS:
GERD KIPER
JOACHIM v. ALBEDYLL

Michael J. Striker
their ATTORNEY

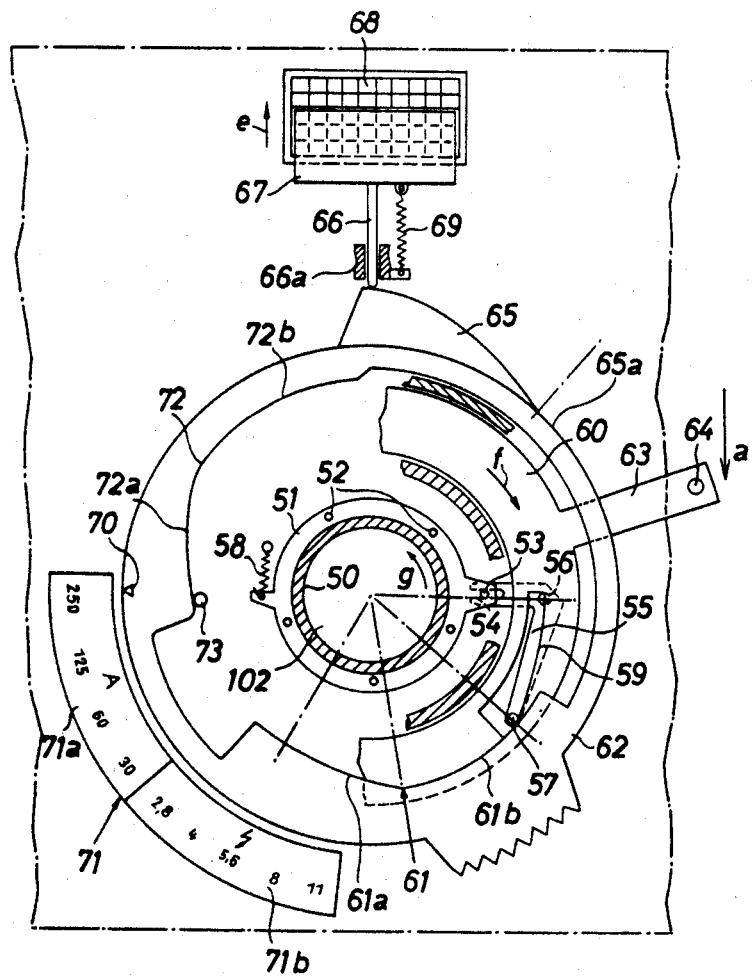

United States Patent Office 3,400,646
Patented Sept. 10, 1968

3,400,646
ADJUSTABLE AUTOMATIC CAMERA
Gerd Kiper and Joachim Von Albedyll, Munich, Germany, assignors to Agfa-Gevaert Aktiengesellschaft, Leverkusen, Germany
Filed July 7, 1965, Ser. No. 470,129
Claims priority, application Germany, July 11, 1964, A 46,567
14 Claims. (Cl. 95—10)

ABSTRACT OF THE DISCLOSURE

An exposure control wherein the diaphragm is adjustable by an exposure meter as a function of scene brightness or by a single rotary selector which further serves to select the exposure time and can effect initial setting of the exposure meter as a function of the selected exposure time. The selector can select any one of several shutter speeds when the diaphragm is adjusted as a function of scene brightness. When the selector selects a desired aperture size, the shutter speed is automatically set to a predetermined value.

---

The present invention relates to photographic cameras in general, and more particularly to improvements in cameras of the type in which, whenever desired by the user, the size of the diaphragm opening may be selected in a fully automatic way as a function of the intensity of light coming from a viewed scene or subject. Still more particularly, the invention relates to automatic cameras of the type wherein the size of the diaphragm opening may be selected in a fully automatic way simultaneously with manual selection of the exposure time.

In heretofore known cameras of this general character, the exposure time is selected by a first member and a second member is used to set the camera for automatic selection of the size of the diaphragm opening. In other words, the user must perform two operations including adjusting the first member with a view to select the exposure time and adjusting the second member with a view to set the camera for automatic determination of the size of the diaphragm opening. Consequently, an inexperienced or absentminded user is likely to forget one of the two operations with the result that the camera will make an inferior exposure.

Accordingly, it is an important object of the present invention to provide a photographic camera which is constructed and assembled in such a way that a single manipulation suffices to set the shutter mechanism for a desired exposure time and to simultaneously set the camera for automatic determination of the size of the diaphragm opening.

Another object of the invention is to provide an automatic camera of the just outlined characteristics wherein, while preparing the diaphragm mechanism for automatic adjustment, the user can simultaneously select any one of several exposure times.

A further object of the instant invention is to provide a novel selector which can carry out the above described operations in response to a single manual adjustment.

An additional object of the invention is to provide an automatic camera of the above outlined characteristics wherein the diaphragm mechanisms may comprise a single movable setting member for the diaphragm blades or two relatively movable setting members.

A concomitant object of the invention is to provide novel operative connections between the selector for automatic or non-automatic determination of the size of the diaphragm opening and certain other parts of the camera.

Still another object of the invention is to provide a novel diaphragm mechanism which may be used in an automatic camera of the above outlined characteristics.

An additional object of the present invention is to provide a still camera which embodies the above outlined features and advantages and which can be rapidly converted for manual selection of the size of the diaphragm opening and/or for flash operation.

A further object of the invention is to provide a novel operative connection between the aforementioned selector and the control means which selects the size of the diaphragm opening as a function of the intensity of incoming light. Briefly stated, one feature of our invention resides in the provision of a camera which comprises adjustable diaphragm and shutter mechanisms respectively including first and second setting means each movable between a plurality of positions to respectively vary the size of the diaphragm opening and the exposure time, adjustable control means including a photosensitive element and being adapted to adjust the first setting means as a function of the intensity of light coming from a subject or scene to be photographed, and a single selector movable by hand between a plurality of first and second positions which the camera is respectively set for automatic and manual selection of the size of the diaphragm opening. The selector comprises three motion transmitting means the first two of which are operative during movement of the selector between the first positions to respectively adjust the second setting means (exposure time) and to simultaneously adjust the control means in dependency on adjustment of the second setting means. The third motion transmitting means is operative when the selector is moved between the second positions to adjust the first setting means (i.e., the size of the diaphragm opening) while the position of the second setting means (exposure time) and the position of the control means remains unchanged.

It will be seen that we provide a camera wherein a single selector, preferably assuming the form of a ring which is rotatable about the optical axis, suffices to select the exposure time when the size of the diaphragm opening is to be determined automatically by the control means as a function of the intensity of incoming light, and to select the size of the diaphragm opening when the shutter mechanism is not to be adjusted by the selector (for example, when the camera is set for flash operation or when the exposure time is to be determined manually by keeping the shutter mechanism open for a desired length of time) and when the control means is prevented from adjusting the diaphragm mechanism to enable the selector to determine the exact size of the diaphragm opening.

The novel features which are considered as characteristic of the invention are set forth in particular in the appended claims. The improved automatic camera itself, however, both as to its construction and its mode of operation, together with additional features and advantages thereof, will be best understood upon perusal of the following detailed description of certain specific embodiments with reference to the accompanying drawings, in which:

FIG. 3 is a diagrammatic fragmentary front elevational view of a modified automatic camera.

Figure 1:
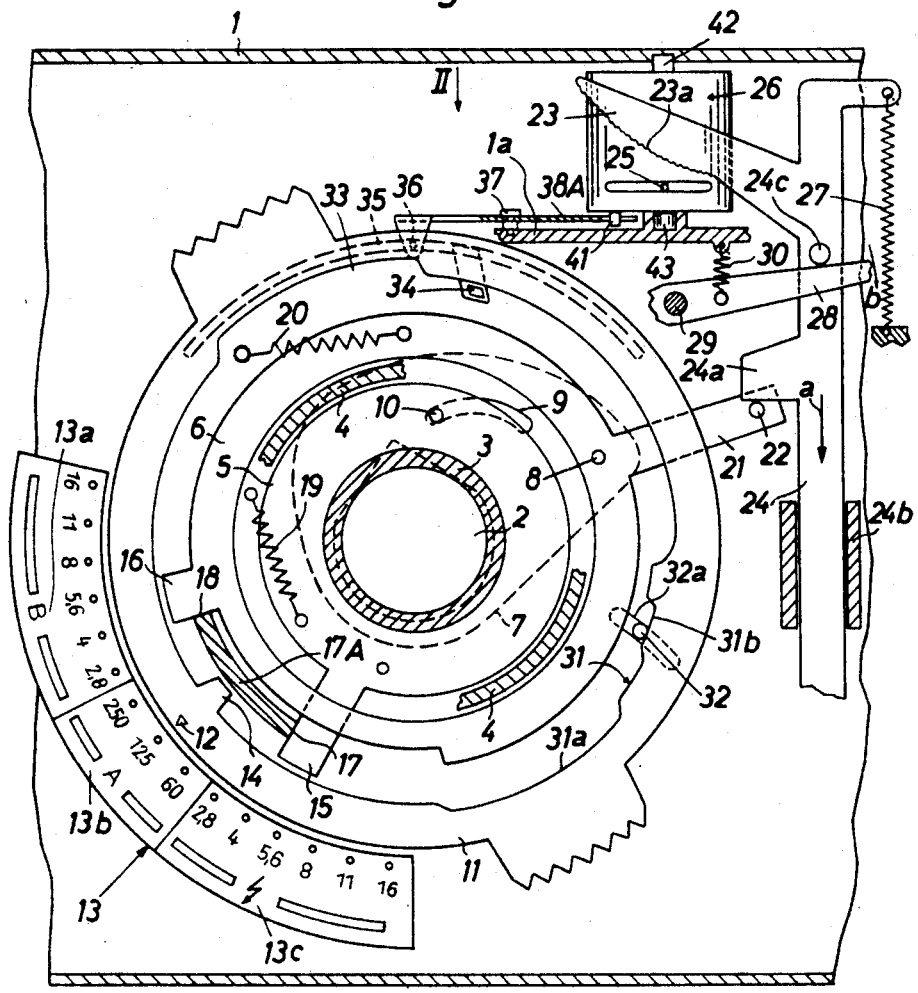
FIG. 1 is a diagrammatic fragmentary front elevational view of an automatic camera which embodies one form of our invention, certain parts of the camera being shown partly in section and in part broken away.

Referring first to FIG. 1, there is shown a still camera which comprises a housing 1 and a lens 2. The housing 1 carries two fixed annular guides 3 and 4 for two rotary setting rings 5 and 6 respectively which together constitute the movable setting means of the diaphragm mechanism. These rings control a series of diaphragm blades 7 (only one shown) which define the diaphragm opening and are turnable on pins 8 carried by the outer setting ring 6. The inner setting ring 5 carries pins 10 which extend into arcuate slots 9 of the blades 7. The blades 7 will change their angular positions with reference to the pins 8 to thereby change the size of the diaphragm opening when the setting ring 5 or 6 is turned with reference to the other setting ring. The fixed guides 3, 4 and the setting rings 5, 6 are concentric with the lens 2, i.e., the setting rings are turnable about the optical axis. The pins 8 may be provided on the blades 7 and then extend into complementary bores of the outer ring 6.

The camera further comprises a single rotary ring-shaped selector 11 which is concentric with the setting rings 5 and 6. The selector 11 carries an index 12 which may be moved into registry with selected graduations of a fixed scale 13. The scale 13 is of arcuate shape and includes three sections including a median section 13b, a first outer section 13a and a second outer section 13c. The outer sections 13a and 13c carry graduations which are indicative of various sizes of the diaphragm opening, and the median section 13b carries graduations which indicate various exposure times. The median section 13b is further provided with an identifying symbol A which indicates that the camera is set for automatic selection of the size of the diaphragm opening when the index 12 registers with one of the exposure time indicating graduations on the median section 13b, i.e., when the selector 11 is being moved by hand between a plurality of first positions during each of which the index 12 remains in registry with the section 13b. The first outer section 13a carries an identifying symbol B which indicates that the exact length of the exposure time is up to the user whenever the index 12 registers with one of the graduations on the section 13a. The second outer section 13c carries an identifying symbol which resembles a flash to indicate that the camera is set for flash exposure when the index 12 registers with one of the graduations on the section 13c. In other words, the selector 11 may be moved by hand between a plurality of second positions while the index 12 remains adjacent to the section 13a or 13c.

The selector 11 carries a radially inwardly extending motion transmitting projection or lug 14 which is located between two radially outwardly extending projections 15, 16 respectively provided on the setting rings 5 and 6. When the camera is set for automatic determination of the size of the diaphragm opening, i.e., when the index 12 registers with one of the graduations on the median section 13b of the fixed scale 13, the projections 15, 16 respectively abut against two circumferentially spaced stop faces 17, 18 provided on a fixed stop member 17A. This stop member 17A is secured to the housing 1 and may be replaced by two separate stop members each of which has a stop face respectively corresponding to the face 17 or 18. The means for respectively biasing the projections 15, 16 into abutment with the stop faces 17, 18 comprises two helical return springs 19, 20 the first of which is secured to the housing 1 and is attached to the inner setting ring 5 so that the latter tends to rotate in a clockwise direction, as viewed in FIG. 1. The second return spring 20 operates between the housing 1 and the outer setting ring 6 and tends to rotate the ring 6 in a counter-clockwise direction.

The outer setting ring 6 carries a radially outwardly extending projection or arm 21 comprising a pin 22 which extends into the path of a nose 24a provided on a reciprocable control member 24 guided in bearings 24b on the housing 1. The control member 24 further comprises an elongated extension or leg 23 which may be arrested by a pointer 25 provided on the rotor (not shown) of an electric instrument 26 here shown as a galvanometer having shafts 42, 43 which are rotatably mounted in the housing 1. The control member 24 is biased by a relatively weak spring 27 which tends to move it downwardly (arrow *a*), as viewed in FIG. 1, so that the leg 23 will move into abutment with the pointer 25 if the control member 24 is allowed to follow the bias of the spring 27. It will be seen that the leg 23 has a serrated or stepped scanning edge 23a which will come into actual engagement with the pointer 25 when the control member 24 moves downwardly.

The control member 24 is normally held against movement in the direction indicated by the arrow *a* because its pin-shaped projection 24c abuts against a manually operable release trigger 28, here shown as a one-armed lever which is rockable about a fixed shaft 29 and is biased by a relatively strong return spring 30. The spring 30 operates between the trigger 28 and a wall 1a forming part of the housing 1. The bias of the spring 30 is stronger than the bias of the spring 27 so that the trigger 28 entrains the control member 24 and moves it upwardly, as viewed in FIG. 1, as soon as the trigger is released and the spring 30 is allowed to contract. When the user wishes to make an exposure, he turns the trigger 28 in the direction indicated by an arrow *b*, whereby the trigger allows the projection 24c to move downwardly and the entire control member 24 moves under the bias of its spring 27. Such movement of the control member 24 results in angular displacement of the outer setting ring 6 (against the bias of the return spring 20) because the nose 24a of the control member 24 bears against the arm 21 and turns the setting ring 6 through an angle determined by the angular position of the pointer 25. When the trigger 28 is turned by hand, the control means (including the member 24 and the galvanometer 26) which can automatically select the size of the diaphragm opening is released so that the angular position of the outer setting ring 6 then reflects the prevailing lighting conditions. As is known from the art of automatic cameras, the control means further includes a photoelectric resistor or a photoelectric cell which is connected in circuit with the galvanometer 26 and causes the pointer 25 to assume an angular position which is a function of the intensity of light coming from a viewed scene or subject. The scanning edge 23a of the leg 23 will arrest the control member 24 in a position which is also a function of the intensity of light that reaches the photoelectric resistor or cell.

The selector 11 carries a second motion transmitting device here shown as a cam 31 which can adjust the shutter mechanism to select the exposure time. This cam 31 has several circumferentially spaced cam faces including an arcuate cam face 31a whose center of curvature is located on the optical axis. The faces of the cam 31 are tracked by a setting means here shown as a pin-shaped follower 32 which is guided in an arcuate slot 32a. The follower 32 forms part of a conventional retard mechanism which in turn forms part of the shutter mechanism, and its function is to set the retard mechanism in such a way that the length of the exposure time will depend on and will be changed in response to changes in angular position of the selector 11 when the index 12 registers with the scale section 13b. The retard mechanism may comprise a mass or weight, or a suitable escapement wheel as is well known in the art.

The selector 11 is also provided with a cam 33 which cooperates with a lever 34 serving to select the length of the exposure time at the will of the operator, i.e., by actuating the lever 34 in a predetermined angular position of the selector 11, the operator can keep the shutter mechanism open for any desired length of time, for example, for a full second or longer.

Figure 2:
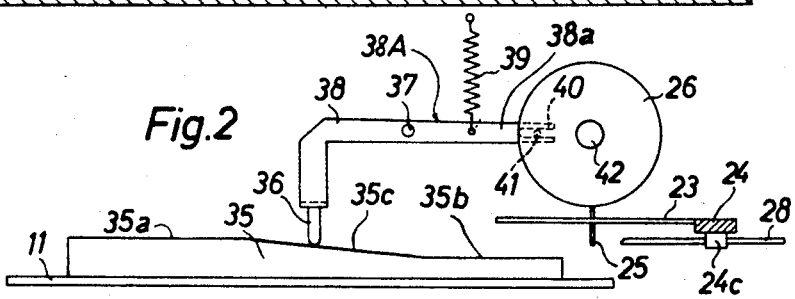
FIG. 2 is a fragmentary end elevational view, substantially as seen in the direction of the arrow II shown in FIG. 1.

Referring to FIG. 2, it will be seen that the rear end face of the selector 11 (namely, that end face of the selector which is not visible in FIG. 1) carries a third motion transmitting device in the form of a substantially wedge-like cam 35 whose cam face is spaced from the general plane of the selector 11 and which cooperates with a follower pin 36 provided on one arm 38 of a two-armed lever 38A which is fulcrumed at 37. When the pin 36 tracks an inclined portion 35c of the face on the cam 35, it will move in the axial direction of the lens 2 because the axis of the fulcrum 37 is normal to the optical axis. The lever 38A is biased by a helical spring 39 which engages the other arm 38a and maintains the follower 36 in abutment with the portion 35c of the face on the cam 35. The face of this cam 35 also comprises two parallel end portions 35a, 35b each located in a plane which is normal to the optical axis so that the follower 36 will not change its axial position when its tip tracks the portion 35a or 35b. The median portion 35c of the face on the cam 35 is inclined so that it will cause the lever 38A to turn whenever the tip of the follower 36 leaves the flat portion 35a to advance toward the flat portion 35b or vice versa. The free end of the right-hand arm 38a is bifurcated to define an open slot 40 which receives an eccentric stud 41 secured to the housing of the galvanometer 26. Thus, the slot 40 and the stud 41 form a coupling which can change the angular position of the pointer 25 in response to such angular displacement of the selector 11 during which the follower 36 tracks the portion 35c on the face of the cam 35. The purpose of the structure shown in FIG. 2 is to select the initial position of the pointer 25 in dependency on the angular position of the selector 11, i.e., to correct the automatic selection of the size of the diaphragm opening which automatic selection will take place after the trigger 28 is turned in the direction indicated by the arrow b and while the index 12 registers with a graduation on the median scale section 13b. In other words, the motion transmitting cam 35 will adjust the control means including the parts 24, 26 and the non-illustrated photosensitive element in dependency on adjustment of the follower 32 which latter constitutes the setting means of the shutter mechanism.

In order to make an exposure with automatic selection of the size of the diaphragm opening, the user will turn the selector 11 until the index 12 registers with a desired graduation on the median scale section 13b, for example with the central graduation "125" which indicates that the exposure time has been determined in advance and is 1/125 of a second. Such selection of the exposure time is made by the setting means of the shutter mechanism, namely, by the follower 32 which then engages a portion 31b of the face on the motion transmitting cam 31, i.e., a portion other than the arcuate portion 31a. At the same time, the follower 36 of the lever 38A travels along the central portion 35c of the face on the motion transmitting cam 35 (FIG. 2) so that the pin-and-slot coupling 40, 41 automatically selects the initial angular position of the galvanometer 26. The pointer 25 of the galvanometer 26 is tunable with reference to the housing and will assume a position which is a function of the intensity of light coming from a viewed scene or subject. By changing the angular position of the lever 38A and hence the angular position of the galvanometer 26, the user corrects the setting of the pointer 25 in dependency on the preselected exposure time (1/125 of a second).

In order to take into consideration the sensitivity of the film which is being used in the camera, the photosensitive element of the control means (i.e., the aforementioned photoelectric resistor or photoelectric cell) may be provided with a masking member (to be described in connection with FIG. 3) so that the exposed area of the resistor or cell will be changed in dependency on the sensitivity of film. However, it is equally possible to take into consideration the sensitivity of the film by changing the angular position of the galvanometer 26. In such cameras, the control means comprises an integrator which will adjust the angular position of the galvanometer 26 not only in dependency on the angular position of the lever 38A but also in dependency on the sensitivity of film. Arrangements which can adjust the angular position of a galvanometer in dependency on the sensitivity of film are disclosed, for example, in the copending application Ser. No. 440,171 of Dieter Engelsmann et al., filed on Mar. 16, 1965 and assigned to the same assignee.

If the user thereupon turns the trigger 28 in a clockwise direction (arrow b in FIG. 1), the control member 24 is caused to move in response to the bias of the spring 27 (arrow a) until the scanning edge 23a of the leg 23 engages the pointer 25. The angular position of the pointer 25 is a function of the intensity of light coming from the viewed scene or subject so that the extent to which the outer setting ring 6 is turned by the nose 24a of the control member 24 is also a function of such intensity. The inner setting ring 5 remains in the llustrated position in which its projection 15 abuts against the stop face 17. As described above, the ring 5 is permanently biased by the spring 19. It is clear that the bias of the spring 20 is weaker than the bias of the spring 27; otherwise, the outer setting ring 6 could not turn in response to movement of the control member 24 in the direction indicated by the arrow a. In response to further turning of the trigger 28, the latter releases the shutter mechanism which causes the shutter blades to open for a length of time which corresponds to 1/125 of a second while the size of the diaphragm opening reflects the angular position of the pointer 25 and hence the intensity of incoming light.

If the size of the diaphragm opening is to be selected by hand, the user turns the selector 11 to one of such angular positions in which the index 12 registers with a graduation on the outer scale section 13a or 13c. During such turning of the selector 11, the motion transmitting lug 14 engages the projection 15 or 16 and turns the setting ring 5 or 6 counter to the bias of the spring 19 or 20 whereby the size of the diaphragm opening is selected in a way to correspond to that which is indicated by the graduation pin-pointed by the index 12 on the scale section 13a or 13c. If the selector 11 is turned in a counterclockwise direction, as viewed in FIG. 1, so that its index 12 registers with a graduation on the outer scale section 13c, the pin-shaped setting means or follower 32 of the retard mechanism tracks the portion 31a on the face of the motion transmitting cam 31 which means that the exposure time remains unchanged because the center of curvature of the portion 31a is located on the optical axis. The engagement of the follower 32 with the portion 31a corresponds to selection of an optimum exposure time for flash operation, for example, to an exposure time of 1/30 of a second. However, if the selector 11 is turned in a counterclockwise direction, as viewed in FIG. 1, so that its index 12 registers with a graduation on the outer scale section 13a, the lever 34 will be adjacent to the cam 33 so that, when the user makes an exposure, the lever 34 can move toward the cam 33 and prevents movement of the diaphragm blades 7 until the trigger 28 is released. In other words, the length of the exposure time then depends solely upon the shutter mechanism which includes the follower 32. The manner in which the lever 34 can prevent angular movement of diaphragm blades 7 in response to operation of the trigger 28 is well known in the art and by itself forms no part of our present invention. Reference may be had to U.S. Patent No. 3,056,340 to Kiper, granted Oct. 12, 1962.

Since the trigger 28 is assumed not only to release the control means which selects the size of the diaphragm opening when the index 12 of the selector 11 registers with a graduation on the median scale section 13b, but also to release the shutter mechanism, the camera of FIG. 1 preferably comprises a locking device which uncouples the control means for automatic selection of the diaphragm opening from the setting ring 6 and also locks the control means when the index 12 registers with the outer scale section 13a or 13c. However, if the trigger 28 merely serves to release the control member 24, i.e., to allow the control means to remain coupled with the setting ring 6, without releasing the shutter mechanism, the camera of our present invention need not include a locking device for the control member 24 when the index 12 registers with the outer scale section 13a or 13c. This will be readily understood since, if the index 12 registers with a graduation on the outer scale section 13a or 13c, the user will have no reason to turn the trigger 28 but will actuate only the second trigger (not shown) which releases the shutter mechanism. In other words, the camera of FIG. 1 may be of the type wherein the trigger 28 releases the shutter mechanism and wherein this trigger also releases the control member 24 during movement to a position in which the shutter mechanism is released, or the camera may be of the type wherein the trigger 28 merely serves to release the control member 24 when the index 12 registers with a graduation on the median scale section 13b and wherein a second trigger, not shown, serves to release the shutter mechanism whenever the index 12 registers with the outer scale section 12a or 13c.

In the embodiment of FIG. 3, the diaphragm mechanism comprises a single movable setting ring 51 which is rotatable on a fixed annular guide 50 surrounding the lens 102. The setting ring 51 is provided with bores 52 for the pins 8 of diaphragm blades (not shown in FIG. 3). Each diaphragm blade is further provided with a slot (corresponding to the slot 9 shown in FIG. 1) which receives a pin fixed to a stationary setting member, not shown in FIG. 3. In other words, the other setting member is fixed and the setting ring 51 is turnable about the optical axis to thereby change the size of the diaphragm opening.

The movable setting ring 51 carries a radially outwardly extending lug provided with a pin 53 which is received in an open slot 54 provided in the bifurcated end of the shorter arm forming part of a bell crank lever 55 which is fulcrumed at 56 so as to be turnable with reference to the housing. The longer arm of the lever 55 carries a pin-shaped follower 57 which may track the face of a motion transmitting cam 61 provided on a manually turnable ring-shaped selector 62 or the face of a cam 59 provided on a rotary ring-shaped control element 60 which can be coupled to the setting ring 51 to automatically select the size of the diaphragm opening. The setting ring 51 is biased by a return spring 58 which tends to rotate it in a clockwise direction, i.e., counter to that indicated by an arrow g.

The control element 60 comprises a radially outwardly extending arm 63 having a pin 64 which is analogous to the pin 22 on the arm 21 of the outer setting ring 6 shown in FIG. 1 and which is engaged by the nose 24a of the control member 24, not shown in FIG. 3. Thus, when the control member 24 moves in the direction indicated in FIG. 3 by the arrow a, the control element 60 will cause the setting ring 51 to change its angular position against the bias of the spring 58 and to thereby select the size of the diaphragm opening as a function of the intensity of light which reaches the exposed portion of a photosensitive element 68.

Depending on the selected exposure time, the camera which embodies the structure of FIG. 3 will automatically change the area of the exposed surface on the photosensitive element 68 by changing the position of an opaque masking member 67 which can overlie a larger or smaller portion of the photosensitive element 68. The means for automatically changing the position of the masking member 67 with reference to the photosensitive element 68 comprises a motion transmitting cam 65 provided on the selector 62 and a push rod 66 which is rigid with the masking member 67 and tracks the face of the cam 65. A spring 69 is provided to bias the rod 66 into engagement with the face of the cam 65, and this spring is connected to a stationary bearing 66a for the rod 66 and to the masking member 67. When the push rod 66 assumes the axial position shown in FIG. 3, the masking member 67 is located in the upper end position and overlies a maximum portion of the photosensitive element 68.

The structure including the motion transmitting cam 65, the rod 66 and the opaque masking member 67 is analogous to and is used as a substitute for the structure including the parts shown in FIG. 2. Thus, instead of using a reciprocable masking member 67, the camera of FIG. 3 could also include a motion transmitting cam 35 to change the angular position of a galvanometer which is connected in circuit with the photosensitive element 68. Also, the camera of FIG. 3 could include a device which would change the position of the opaque masking member 67 in dependency on the sensitivity of film which is being used at a particular time, and the means for moving the masking member 67 would then include an integrator which would move the masking member in and counter to the direction indicated by an arrow e so that such movement of the masking member would account for the sensitivity of film and also for a selected exposure time when the camera is operated with automatic selection of the size of the diaphragm opening. Still further, the parts 65–67 of FIG. 3 may be omitted if the photosensitive element 68 is connected in series with a variable resistor which is adjusted to account for a selected exposure time and/or for the sensitivity of film.

The selector 62 carries an index 70 which may register with graduations provided on a fixed arcuate scale 71. This scale comprises a first section 71a which corresponds to the median section 13b of the scale 13 shown in FIG. 1, and a second section 71b which corresponds to the section 13c of the scale 13. The section 71a carries a symbol A which indicates to the user that the camera is set for automatic determination of the size of the diaphragm opening when the index 70 registers with one of the graduations on the section 71a, such graduations indicating various preselected exposure times. The section 71b carries a symbol which represents a flash to indicate that the camera is set for flash operation when the index 70 registers with a graduation on the section 71b. The graduations on the section 71b of the scale 71 indicate various sizes of the diaphragm opening.

The selector 62 also carries a further motion transmitting cam 72 which may adjust the position of a setting means here shown as a follower pin 73 forming part of a retard mechanism for the shutter mechanism. The cam 72 has a cam face including two portions 72a, 72b.

When the index 70 degisters with a graduation on the scale section 71a, the motion transmitting cam 65 engages the tip of the push rod 66 for the opaque masking member 67 and the portion 72a of the face on the motion transmitting cam 72 engages the follower pin 73 of the retard mechanism. When the index 70 registers with a graduation on the scale section 71b, the follower pin 73 engages the portion 72b on the face of the cam 72 so that the retard mechanism is not adjusted because the center of curvature of the portion 72b is located on the optical axis. At the same time, the push rod 66 engages an arcuate portion 65a on the periphery of the selector 62 and, therefore, the axial position of the push rod remains unchanged because the center of curvature of the arcuate portion 65a is also located on the optical axis. However, the selector 62 then changes the size of the diaphragm opening by causing the portion 61a on the face of the motion transmitting cam 61 to engage the follower 57. The inclination of the cam face portion 61a is such that the size of the diaphragm opening will correspond to the size indicated by that graduation on the scale section 71a which is pinpointed by the index 70 of the selector 62.

It is clear that the camera of FIG. 3 may be modified to provide for manual selection of the exposure time in the same way as described in connection with the section 13a of the fixed scale 13 shown in FIG. 1. All that one would have to do would be to provide the selector 62 with a cutout or cam 33 which would receive the lever 34 when the selector 62 would move to an angular position in which the index 70 would register with a third section (not shown) of the scale 71 such as would correspond to the outer section 13a of the scale 13. Also, in such constructions, the face of the motion transmitting cam 61 would be provided with a third portion which would be engaged by the follower 57 during registry of the index 70 with a graduation on the third section of the scale 71.

In order to make an exposure with automatic selection of the size of the diaphragm opening, the user turns the selector 62 so that the index 70 registers with a graduation on the scale section 71a, for example, with a graduation "250" which indicates that the exposure time has been selected to be $\frac{1}{250}$ of a second. The portion 72a of the face on the motion transmitting cam 72 then adjusts the setting means 73 for the retard mechanism for such exposure time and the motion transmitting cam 65 shifts the push rod 66 so that the position of the opaque masking member 67 is selected by full consideration of an exposure time corresponding to $\frac{1}{250}$ of a second. As shown, the push rod 66 will cause the masking member 67 to overlie a maximum portion of the photosensitive element 68 when the index 70 registers with the graduation "250" on the scale section 71a. The follower 57 then engages the portion 61b of the motion transmitting cam 61 so that the turning of the selector 62 to the angular position of FIG. 3 does not change the angular position of the movable setting ring 51. The center of curvature of the portion 61b is located on the optical axis.

The user then turns the trigger 28 in the same way as described in connection with FIG. 1, whereby the control member 24 moves in the direction indicated by the arrow *a* and causes the control element 60 to turn in a clockwise direction (arrow *f*) to the extent determined by the pointer 25 of the galvanometer 26. The angular position of the pointer 25 will depend on the resistance offered by the photosensitive element 68 which is exposed to light coming from a viewed scene or subject. The cam 59 of the control element 60 turns the follower 57 so that the angular position of the lever 55 changes with resultant change in the angular position of the setting ring 51, such adjustment of the setting ring 51 taking place against the bias of the return spring 58, i.e., in the direction indicated by the arrow *g*. On further turning of the trigger 28, the later releases the shutter mechanism and the camera makes an exposure. Of course, the camera of FIG. 3 may also comprise two triggers one of which will release the control member 24 and the other of which will release the shutter mechanism.

In order to make an exposure with flash illumination, the user turns the selector 62 until the index 70 registers with a desired graduation on the scale section 71b, i.e., the user then determines in advance the exact size of the diaphragm opening. During turning of the index 70 into registry with a graduation on the section 71b, the follower pin or setting means 73 of the retard mechanism for the shutter mechanism engages the portion 72b of the face on the motion transmitting cam 72 and, therefore, the exposure time remains unchanged because the center of curvature of the portion 72b is located on the optical axis. As mentioned in connection with FIG. 1, the selected exposure time for flash operation may be $\frac{1}{30}$ of a second. When the selector 62 is turned to move the index 70 into registry with a graduation on the scale section 71a, the follower 57 is engaged by the portion 61a of the face on the motion transmitting cam 61 so that the lever 55 is rocked in a sense to adjust the angular position of the setting ring 51 until the size of the diaphragm opening corresponds to that indicated by the selected graduation on the section 71b. The tip of the push rod 66 is then in abutment with the arcuate portion 65a and the position of the opaque masking member 67 remains unchanged because the center of curvature of the arcuate portion 65a is located on the optical axis.

The camera of FIG. 3 may also be provided with a locking device which will block the control means including the parts 60 and 68 when the index 70 registers with the scale section 71b because the size of the diaphragm opening is then selected beforehand, i.e., not as a function of the resistance offered by the photosensitive element 68 to the flow of electric current.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is:

1. In a camera, adjustable diaphragm and shutter mechanisms respectively comprising first and second setting means each movable between a plurality of positions to respectively vary the size of the diaphragm opening and the exposure time; adjustable control means for adjusting said first setting means as a function of the intensity of light coming from a subject or scene; and a single selector operatively connected with said second setting means and with said control means to adjust said control means, said selector being movable by hand to select a desired one of several positions of said second setting means before said first setting means is adjusted by said control means, the adjustment of said control means depending on the position of said second setting means.

2. In a camera, adjustable diaphragm and shutter mechanisms respectively comprising first and second setting means each movable between a plurality of positions to respectively vary the size of the diaphragm opening and the exposure time; adjustable control means including a photosensitive element for adjusting said first setting means as a function of the intensity of light coming from a subject or scene; and a single annular selector operatively connected with said second setting means and with said control means and being rotatable by hand about the optical axis to select the position of said second setting means when said first setting means is adjusted by said control means and to simultaneously adjust said control means in dependency on the position of said second setting means.

3. In a camera, adjustable diaphragm and shutter mechanisms respectively comprising first and second setting means each movable between a plurality of positions to respectively vary the size of the diaphragm opening and the exposure time; adjustable control means including a photosensitive element and being normally coupled with and arranged to adjust said first setting means as a function of the intensity of light coming from a scene or subject; and a single selector movable by hand between a plurality of first and second positions, said selector comprising first and second motion transmitting means both operative during movement of the selector between said first positions for respectively adjusting said second setting means when said control means is coupled to said first setting means and for simultaneously adjusting said control means independency on the position of said second setting means, said selector further comprising third motion transmitting means operative during movement of the selector between said second positions for adjusting the first setting means while the position of said second setting means and said control means remains unchanged.

4. In a camera, adjustable diaphragm and shutter mechanisms respectively comprising first and second setting means each movable between a plurality of positions to respectively vary the size of the diaphragm opening and the exposure time; adjustable control means including a photo-sensitive element and being normally coupled with and arranged to adjust said first setting means as a function of the intensity of light coming from a scene or subject; and a single selector movable by hand to at least one first position and between a plurality of second positions, said selector comprising first and second motion transmitting means both operative in the first position of said selector for respectively adjusting said second setting means when said control means is coupled to said first setting means and for simultaneously adjusting said control means in dependency on the position of said second setting means, said selector further comprising third motion transmitting means operative during movement of the selector between said second positions for adjusting the first setting means while the position of said second setting means and said control means remains unchanged.

5. In a camera, adjustable diaphragm and shutter mechanisms respectively comprising first and second setting means each movable between a plurality of positions to respectively vary the size of the diaphragm opening and the exposure time, said first setting means comprising a pair of setting rings rotatable about the optical axis to change the size of the diaphragm opening when one thereof ratates with reference to the other ring, projections provided on said rings, a pair of spaced stops, and spring means for biasing said projections against said stops; adjustable control means including a photo-sensitive element and being adapted to adjust one of said setting rings as a function of the intensity of light coming from a scene or subject; and a single selector movable by hand between a plurality of first and second positions, said selector comprising first and second motion transmitting means both operative during movement of the selector between said first positions for respectively adjusting said second setting means when said control means is free to adjust said one setting ring and for simultaneously adjusting said control means in dependency on the position of said second setting means, said selector further comprising third motion transmitting means located intermediate said projections during movement of the selector between said first positions, said third motion transmitting means engaging one of said projections and turning the respective setting ring during movement of the selector between said second positions while the position of said second setting means and said control means remains unchanged.

6. In a camera, adjustable diaphragm and shutter mechanisms respectively comprising first and second setting means each movable between a plurality of positions to respectively vary the size of the diaphragm opening and the exposure time, said first setting means comprising a setting ring rotatable about the optical axis and rockable lever means for rotating said ring; adjustable control means including a photosensitive element and adapted to rock said lever as a function of the intensity of light coming from a viewed scene or subject; and a single selector movable by hand between a plurality of first and second positions, said selector comprising first and second motion transmitting means both operative during movement of the selector between said first positions for respectively adjusting said second setting means when said lever is free to be rocked by said control means and for simultaneously adjusting said control means in dependency on the position of said second setting means, said selector further comprising third motion transmitting means operative during movement of the selector between said second positions for rocking said lever while the position of said second setting means and said control means remains unchanged.

7. In a camera, adjustable diaphragm and shutter mechanisms respectively comprising first and second setting means each movable between a plurality of positions to respectively vary the size of the diaphragm opening and the exposure time; adjustable control means including a photosensitive element and being normally coupled with and arranged to adjust said first setting means as a function of the intensity of light coming from a scene or subject; and a single selector movable by hand between a plurality of first and second positions, said selector comprising first and second motion transmitting means both operative during movement of the selector between said first positions for respectively adjusting said second setting means when said control means is coupled to said first setting means and for simultaneously adjusting said control means in dependency on the position of said second setting means, said selector further comprising third motion transmitting means operative during movement of the selector between said second positions for adjusting the first setting means while the adjustment of said control means remains unchanged and while said first motion transmitting means maintains said second setting means in a position corresponding to an optimum exposure time for flash operation.

8. In a camera, adjustable diaphragm and shutter mechanisms respectively comprising first and second setting means each movable between a plurality of positions to respectively vary the size of the diaphragm opening and the exposure time; adjustable control means including a photosensitive element and being normally coupled with and arranged to adjust said first setting means as a function of the intensity of light coming from a scene or subject; a single selector movable by hand between a plurality of first and second positions, said selector comprising first and second motion transmitting means both operative during movement of the selector between said first positions for respectively adjusting said second setting means when said control means is coupled to said first setting means and for simultaneously adjusting said control means in dependency on the position of said second setting means, said selector further comprising third motion transmitting means operative during movement of the selector between said second positions for adjusting the first setting means while the position of said second setting means and said control means remains unchanged; and means provided on said selector for allowing for manual selection of the exposure time by opening the shutter mechanism for an interval of desired length.

9. In a camera, adjustable diaphragm and shutter mechanisms respectively comprising first and second setting means each movable between a plurality of positions to respectively vary the size of the diaphragm opening and the exposure time; adjustable control means including a photosensitive element and being normally coupled with and arranged to adjust said first setting means as a function of the intensity of light coming from a scene or subject; and a single selector movable by hand between a plurality of first and second positions, said selector comprising first and second motion transmitting means both operative during movement of the selector between said first positions for respectively adjusting said second setting means when said control means is coupled to said first setting means and for simultaneously adjusting said control means in dependency on the position of said second setting means, said second motion transmitting means comprising a cam provided on and movable with said selector, said selector further comprising third motion transmitting means operative during movement of the selector between said second positions for adjusting the first setting means while the position of said second setting means and said control means remains unchanged.

10. In a camera, adjustable diaphragm and shutter mechanisms respectively comprising first and second setting means each movable between a plurality of positions to respectively vary the size of the diaphragm opening and the exposure time; adjustable control means including a photosensitive element and being normally coupled with and arranged to adjust said first setting means as a function of the intensity of light coming from a scene or subject; and a single selector rotatable by hand about the optical axis between a plurality of first and second positions, said selector comprising first and second cam means both operative during rotation of the selector between said first positions for respectively adjusting said second setting means when said control means is coupled to said first setting means and for simultaneously adjusting said control means in dependency on the position of said second setting means, said selector further comprising third cam means operative during rotation of the selector between said second positions for adjusting the first setting means while the position of said second setting means and said control means remains unchanged.

11. A structure as set forth in claim 10, wherein said control means comprises a rotary galvanometer and further comprising an operative connection between said second cam means and said galvanometer for rotating the galvanometer in response to rotation of the selector between said first positions.

12. A structure as set forth in claim 10, wherein said control means comprises an opaque masking member movable in front and arranged to overlie portions of said photosensitive element, and further comprising an operative connection between said second cam means and said masking member to change the position of the masking member in response to rotation of the selector between said first positions.

13. In a camera, adjustable diaphragm and shutter mechanisms respectively comprising first and second setting means each movable between a plurality of positions to respectively vary the size of the diaphragm opening and the exposure time, said shutter mechanism comprising an adjustable retard mechanism and said second setting means comprising a movable cam follower arranged to adjust said retard mechanism; adjustable control means for adjusting said first setting means as a function of the intensity of light coming from a subject or scene; and a single selector operatively connected with said second setting means and with said control means and being movable by hand to select the position of said second setting means when said first setting means is adjusted by said control means and to simultaneously adjust said control means in dependency on the position of said second setting means, said selector comprising a cam engaging said follower during movement of the selector to set the camera for automatic determination of the size of the diaphragm opening.

14. In a camera, adjustable diaphragm and shutter mechanisms respectively comprising first and second setting means each movable between a plurality of positions to respectively vary the size of the diaphragm opening and the exposure time; adjustable control means for adjusting said first setting means as a function of the intensity of light coming from a subject or scene; and a single selector operatively connected with said second setting means and with said control means and being movable by hand between a plurality of first positions to select the position of said second setting means when said first setting means is adjusted by said control means and to simultaneously adjust said control means in dependency on the position of said second setting means, said selector being also movable between a plurality of second positions and comprising motion motion transmitting means for moving said first setting means during movement between such second positions.

References Cited

UNITED STATES PATENTS 3,318,214   5/1967   Singer et al. _____ 95—10

NORTON ANSHER, *Primary Examiner.*

JOSEPH F. PETERS, *Assistant Examiner.*